United States Patent

[11] 3,630,545

| [72] | Inventors | John P. K. Fontaine<br>Box 704-Route 11;<br>William D. Benson, both of Birmingham,<br>Ala. 35210 |
|---|---|---|
| [21] | Appl. No. | 37,992 |
| [22] | Filed | May 18, 1970 |
| [45] | Patented | Dec. 28, 1971 |
| [73] | Assignee | said Fontaine by said Benson |

[54] FIFTH WHEEL WITH IMPROVED WEDGE AND JAW OPERATING LEVER
6 Claims, 5 Drawing Figs.

[52] U.S. Cl. .................................................... 280/434
[51] Int. Cl. ..................................................... B62d 53/08
[50] Field of Search........................................... 280/434

[56] References Cited
UNITED STATES PATENTS
2,726,878  12/1955  Fontaine ..................... 280/434

3,318,616  5/1967  Fontaine et al. ............... 280/434

*Primary Examiner*—Leo Friaglia
*Attorney*—Jennings, Carter & Thompson

ABSTRACT: A fifth wheel of the kind having a jaw and a wedge for the jaw, a handle for operating said parts so constructed and arranged that the handle may be assembled for operative connection with the wedge and jaw by passing the handle through the frame parts of the fifth wheel, generally on a level plane, thus eliminating the necessity of cutting vertically enlarged slots through the frame parts, thus retaining the strength of said frame parts. A further improvement is an operating handle which has a pair of side opening slots to receive the pins or the like which operatively connect the handle to the wedge and jaw to permit the assembly aforesaid, and a plate or the like welded to the bottom surface of the handle and spanning the slots, thus to form bottoms for the same, this plate preventing the pins or the like from becoming disconnected with the respective wedge and jaw in the event the pins become loose and also strengthening the handle.

INVENTOR.
John P. K. Fontaine
BY William D. Benson

Jennings Carter & Thompson
Attorneys

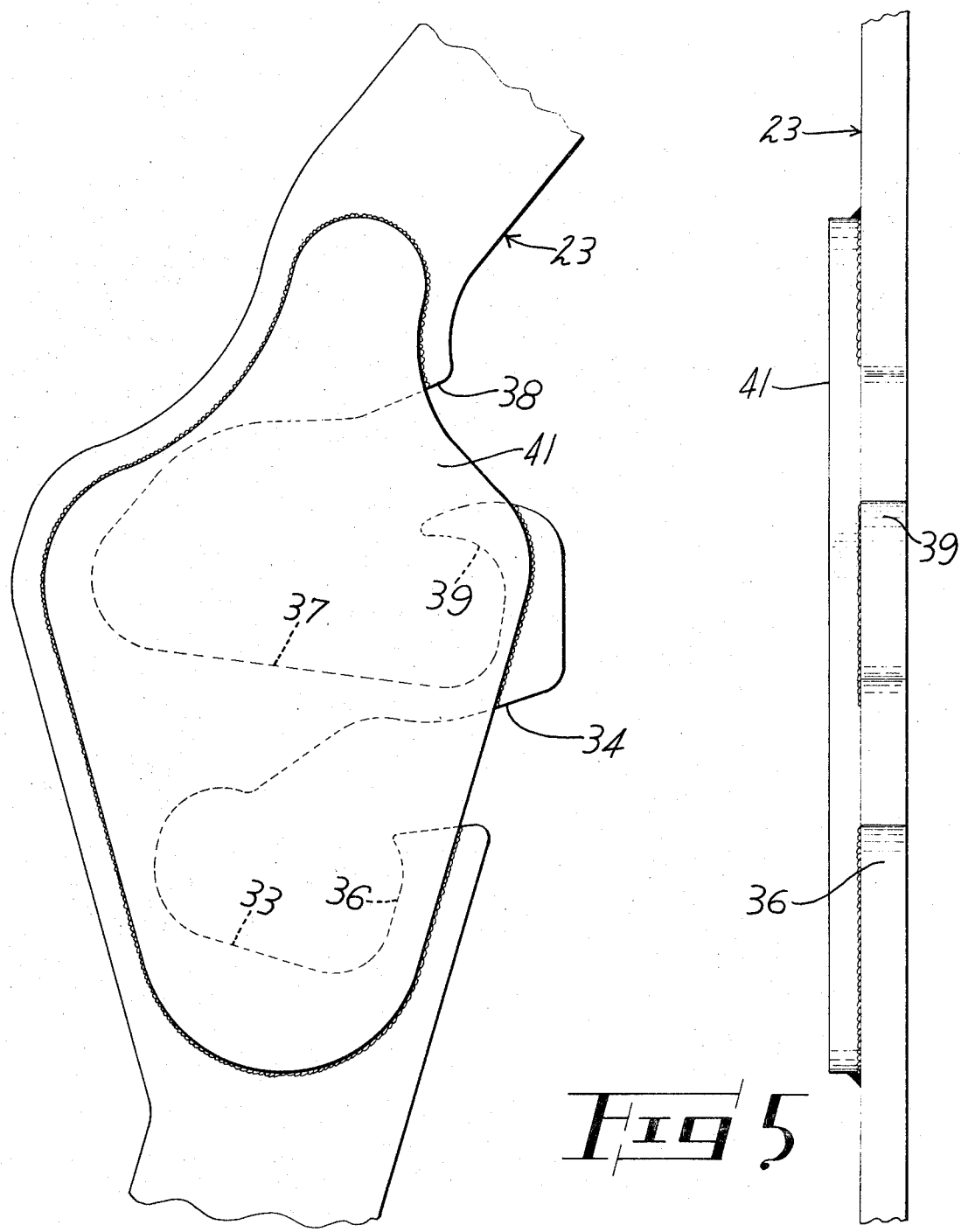

FIFTH WHEEL WITH IMPROVED WEDGE AND JAW OPERATING LEVER

Our invention relates to an improvement in fifth wheels for connecting a trailer or the like to a tractor.

An object of our invention is to provide an improved fifth wheel characterized by greater strength than heretofore possible with fabricated fifth wheels, a fifth wheel in which the handle for operation the wedge and jaw thereof also includes means positively to secure the usual depending pins carried by the jaw and wedge so that if these pins become loose relative to the jaw and wedge, they will not become completely disconnected.

A more specific object is to provide a fifth wheel embodying the usual kingpin-retaining jaw and wedge for the same in which there is provided an improved handle for operating the jaw and wedge, said handle embodying generally a plate member having a pair of side opening slots therethrough with tongues adjacent the open sides of the slots which are adapted, when the handle is moved toward uncoupling position, first to engage the wedge and then to engage the jaw, to move these parts in that sequence to unlocking position, there being secured on the underside of the handle and over the area of the slots a plate or the like thus to form bottoms for the same, whereby the pins are held captive relative to the jaw and wedge and handle, even if they should become loose in the jaw and wedge, providing an improved safety feature.

Another object is to provide a fifth wheel of the fabricated type in which the operating handle may be assembled generally by moving the same through and around the various parts with which it is to be connected and in which and relative to which it slides, by moving the same on a generally horizontal plane, the side opening slots permitting the same to be connected to the pins of the wedge and jaw, and the end of the handle being pivotally secured to the frame of the fifth wheel by means of a removable pivot member.

Apparatus illustrating features of our invention is shown in the accompanying drawings forming a part of this application in which:

FIG. 4 is an enlarged fragmental detail view of the underside of the operating handle in the pin-engaging slot area thereof; and, FIG. 5 is a detail fragmental side elevational view of the handle in the slot area thereof.

Figure 1:
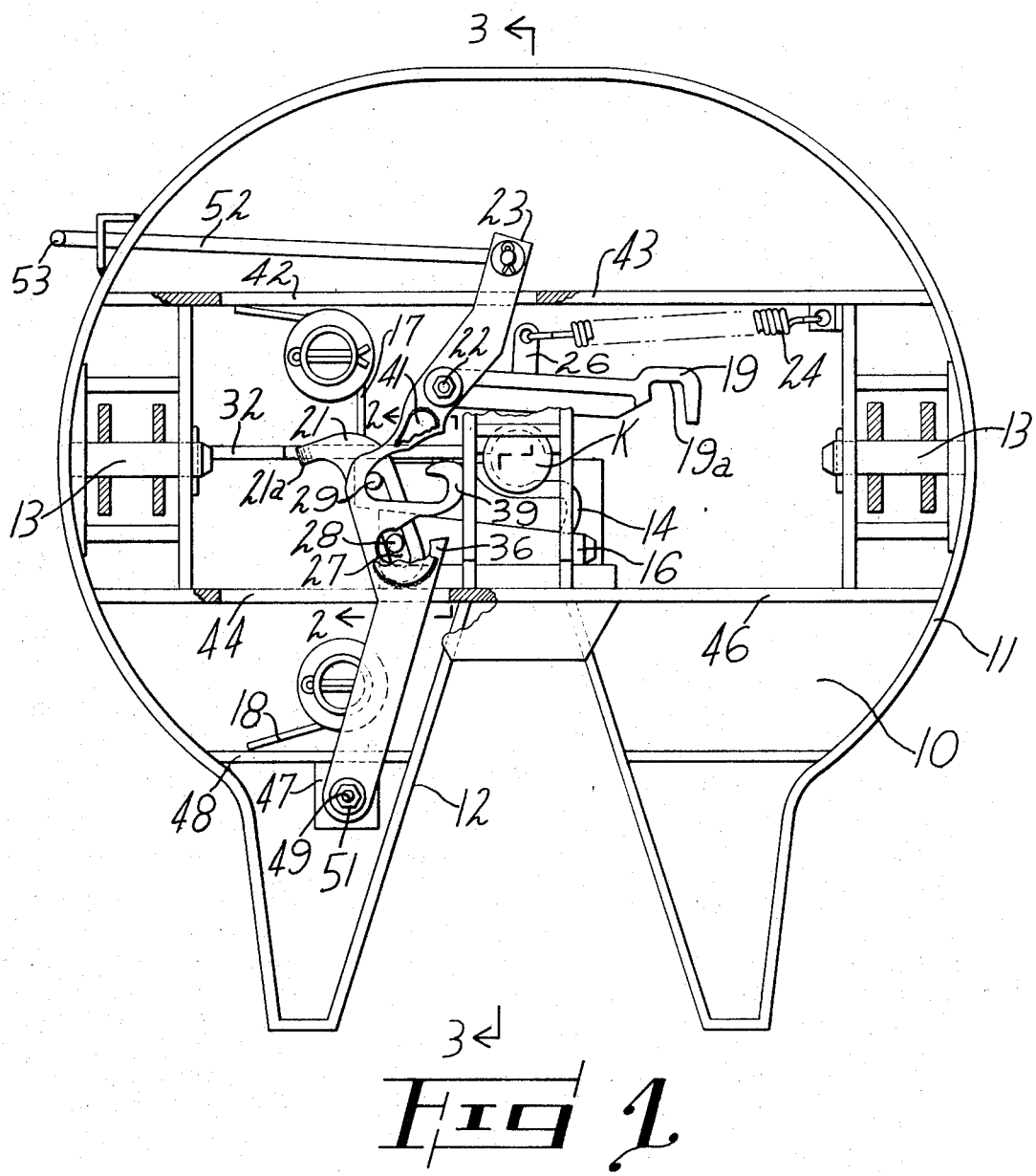
FIG. 1 is a bottom view of a fifth wheel embodying out improved handle arrangement, certain parts being broken away in section.
Figure 2:
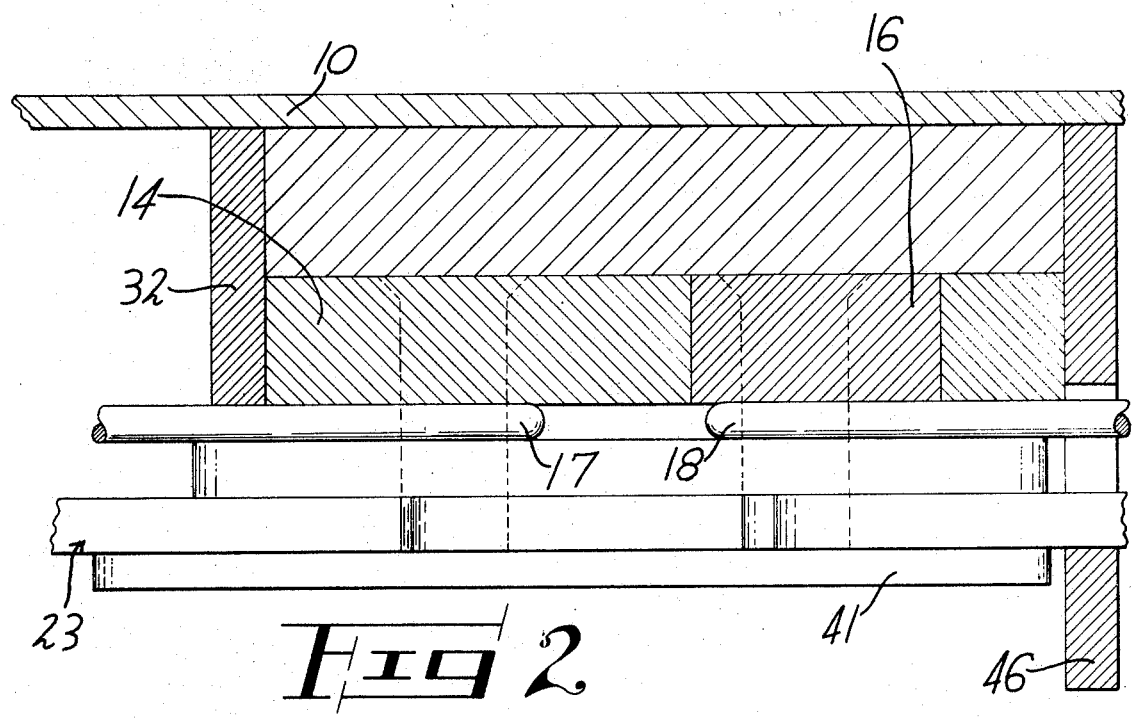
FIG. 2 is an enlarged detail sectional view taken generally along line 2—2 of FIG. 1, the view being turned over so that the bottom of the apparatus is at the bottom of the sheet of drawing.
Figure 3:
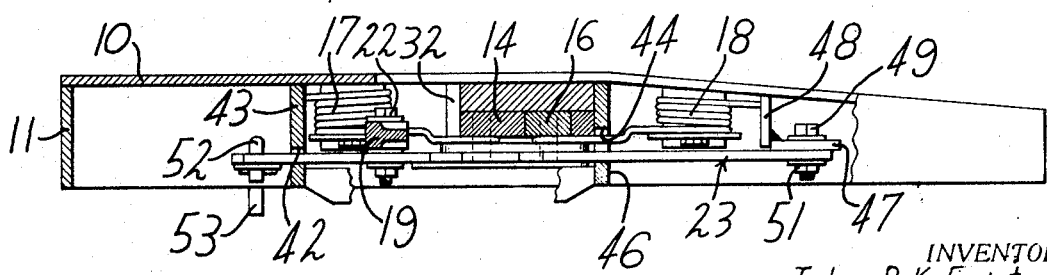
FIG. 3 is a sectional view taken generally along line 3—3 of FIG. 1, certain parts being omitted, and showing the fifth wheel with its bottom portion turned toward the bottom of the sheet of drawings.

Referring now to the drawings for a better understanding of our invention we show the same in association with a fifth wheel which embodies the upper plate 10, the reinforcing skirt portion 11, the converging entering slot or opening 12 for the kingpin to be connected and mounting means 13 on which the fifth wheel is pivotally mounted to the tractor, as is understood. Further, we show our invention in association with that type of fifth wheel which embodies a kingpin jaw 14 and a locking wedge 16 associated therewith. As is well understood in the art, in coupled position as shown in FIG. 1, the king pin K has entered the slot and has moved into the proper connecting position relative to the fifth wheel whereupon the jaw 14 has moved in to engage about the lock the kingpin in place, whereupon the wedge 16 has been moved into place to lock the jaw. Springs indicated at 17 and 18 urge the jaw and wedge, respectively, toward locking position. Also, at 19 we illustrate what is commonly called in the art a "bumper" and at 21 what is commonly called a "timer." It will be understood that the bumper is pivotally connected at 22 to the operating handle 23 presently to be described more in detail. A tension spring 24 connected to a lug 26 on the bumper urges the bumper and handle toward locking position.

The timer is provided with a slot 27 in one end which slidably fits about a pin 28 depending from the underside of the wedge. The timer also is pivotally mounted about a pin 29 which depends from the jaw 14. As will presently appear when the handle 23 is moved to unlocking position, that is to the left as shown in FIG. 1, the pin 28 is first engaged by a portion of the handle presently to be described, thus to withdraw the wedge to some extent, and subsequent to this the pin 29 is engaged, thus to withdraw the jaw. The timer has an extension 21a which engages behind a wall 32 of the framework. When the handle is moved all the way to the left a notch 19a in the bumper 19 engages a part of the framework to hold the parts in uncoupled position, permitting the kingpin to be moved into and out of the fifth wheel. With the parts in the uncoupled position automatic coupling is effected simply by backing the tractor carrying the fifth wheel onto the kingpin K whereupon the bumper is released, permitting the parts to move automatically to coupled position, under the influence of the various springs involved.

The foregoing generally describes a somewhat standard form of fifth wheel currently on the market. Our improvement comprises simplification in the framework of the fifth wheel, the method of assembling the operating handle 23 to the various parts and pivoting same to the frame as well as specific improvements in the handle and its relation to the pins 28 and 29 which operate the wedge and jaw, respectively. It will thus be seen that the operating handle 23 is provided with a shaped slot 33, open at 34 along one edge of the handle. A tongue 36 adjacent the open end of the slop is provided so that when the handle moves to the left as shown in FIGS. 1 and 4, the tongue portion engages the pin 28 to move the wedge.

Somewhat in similar manner there is a shaped slot 37 having an opening 38 along the edge of the handle as shown and a tongue 39 which engages the pin 29 to move it to the left, thus to move the jaw to unlocking position. Slot 37 is somewhat longer in lateral extent than slot 33.

The slots 37 and 33 are bottomed as illustrated by the plate 41 which is welded to he underside of the handle 23. This plate 41 therefore has the purpose and effect of forming bottoms for the slots 33 and 37 and also provides a safety means to prevent the pins 28 and 29 from becoming disengaged from the wedge and jaw, should these pins become loose, which in the past has happened.

It will be noted that the handle 23 passes through a slot 42 in the transverse cross bracing member 43 of the fifth wheel frame structure and also through a slot 44 in the transverse, depending brace member 46 of the frame. Further, handle 23 is pivotally mounted on a plate 47 carried by a short cross brace 48. The pivotal connection is by means of a stud 49 and a nut 51, that is, the stud ad nut forming a removable pivot point. Due to the provision of the side opening slots the handle 23 may be assembled by sliding it through the slots 42 and 44, engaging the pins 28 and 29 in their respective slots 33 and 37 and then inserting the removable bolt 49 with its nut 51 to pivotally secure the end of the handle. In this fashion the depth of the slots 42 and 44 can be greatly reduced over the method of assembling other prior art types of operating handles currently in use. Considerable amount of strength thus is added to the entire fifth wheel assembly.

AT 52 we show an operating handle having a downturned portion 53 for manually opening or moving the parts to uncoupling position.

From the foregoing the method of constructing and further advantages of our invention may now be more fully explained and understood. With the operating handle fabricated as illustrated it will be seen that it is only as thick as the metal of the handle itself, plus the thickness of the plate 41. Therefore, the operating parts of the device, except for the bumper 19, may be completely assembled in the framework, whereupon the handle may be passed through the slot 42 or slot 44, the pins 28 and 29 entered in their respective slots through the slide openings 34 and 38 an the pivotal connection by the bolt 49 an nut 51 completed. The bumper is connected at 22, whereupon the handle 52 is connected as illustrated. The springs 17 and 18 have previously been put in place and spring 24 is connected as shown.

It will be especially noted that the handle is assembled in generally a level or common plane. That is, it can not necessary as heretofore to provide deep slots in the various plates through which the handle passes in order to make the assembly. With our improvement and due to the side opening slots for receiving the pins which the handle is to operate, it can be passed straight through, operatively associated with the pins for the jaw and wedge and then pivotally connected to the framework of the fifth wheel housing or frame itself.

In operation, handle 52 is moved by grasping the downturned portion 53 and pulling the same outwardly. This first causes the pin 28 to be engaged by the tongue 36, moving the wedge out of wedging engagement between the housing parts and the jaw. Further leftward movement of the free end of the handle 23 then causes the tongue 39 to engage pin 29, moving the jaw from in front of the king pin, and moving both the wedge and jaw clear of the entry slot for the kingpin. The timer end 21a engages slidably behind the wall 32 and finally the bumper has its notch 19a engaged in a suitable part of the framework to hold the parts in uncoupled position. When coupling, the tractor is simply backed up to the trailer until the kingpin hits the bumper, releasing its detent end 19a, whereupon the springs automatically snap all the parts back to locked position, when the kingpin is fully seated in proper position.

In view of the foregoing it will be seen that we have devised an improved, simplified and greatly strengthened, fabricated fifth wheel. The provision of the operating handle 23 with the side opening slots which can be engaged about the depending members for the wedge and jaw, by a simple sliding movement, horizontally, as distinguished from vertical movement affords considerable convenience in assembly. Furthermore, by bottoming these slots with the plate 41 we provide an important safety feature, namely, we always maintain the wedge and lock operatively connected to the handle, inasmuch as the pins or other depending members used for this purpose cannot drop out of the structure should they become loose.

While we have shown our invention in but one form, it will be obvious to those skilled in the art that it is not so limited, but is susceptible of various other changes and modifications without departing from the spirit thereof.

What we claim is:

1. The combination with a fifth wheel of the kind having a frame formed of a top plate and depending members beneath the plate and a kingpin jaw and wedge locking arrangement, of
   a. downwardly projecting members carried by the jaw and wedge,
   b. an operating handle for the jaw and wedge pivoted adjacent one end to the fifth wheel,
   c. said handle passing through at least one of the depending frame members and having one open-sided slot with a tongue adjacent the open side thereof disposed to engage the downwardly projecting wedge member when the handle is moved to uncoupling position, thus to move the wedge,
   d. a second open-sided slot in the handle with a tongue adjacent the open side thereof adapted to engage the downwardly projecting jaw member after the handle has moved the wedge toward uncoupling position, thereby to move the jaw to uncoupling position subsequent to moving the wedge, and
   e. means biasing the handle, wedge and jaw toward coupling position.

2. Apparatus as defined in claim 1 in which the bottoms of said slots are closed by a member carried by a lower surface of the handle, thereby to assure that said downwardly projecting wedge and jaw members remain operatively connected to the jaw and wedge.

3. Apparatus as defined in claim 1 in which the handle is pivoted to the fifth wheel body at the end thereof nearest the slot and tongue which operate the wedge, said slot for the jaw having a greater lateral dimension than the slot for the wedge, thus causing the wedge to start its uncoupling movement prior to the jaw when the handle is moved toward uncoupling position.

4. Apparatus as defined in claim 1 in which the body of the fifth wheel is provided with vertically disposed fore-and-aft spaced-apart braces, there being slots in said braces through which the handle projects and in which it travels when moved about its pivot, said pivot for the handle embodying a removable pivot member, whereby said slots in the braces may be substantially no deeper than the thickness of the handle and the handle may be assembled by passing it through the slots in the plates and inserting said jaw and wedge pins through said open-sided slots, said removable pivot member then being secured.

5. For use in sequentially operating the locking wedge and jaw of a fifth wheel, which fifth wheel comprises a frame having depending members through which the arm set forth herein is adapted to extend,
   a. a platelike arm having a pair of open-sided slots with tongues adjacent the open sides adapted to engage depending members carried by he wedge and jaw, thus to move then to uncoupling position, and
   b. said slots and tongues being configured and relatively dimensioned so that when the handle is moved toward uncoupling position the wedge is moved prior to movement of the jaw.

6. The device of claim 5 in which there is a cover secured to the undersurface of said arm and forming bottoms for said slots, thereby to strengthen the arm in the slot areas thereof and to prevent said depending members from becoming operatively disconnected from their respective wedge and jaw.

* * * * *